(12) United States Patent
Avans et al.

(10) Patent No.: US 10,577,759 B2
(45) Date of Patent: Mar. 3, 2020

(54) DRIVE BELT DISENGAGEMENT FOR CUTTER DRUM OF MILLING MACHINE AND AUXILIARY DRUM DRIVE ASSEMBLY

(71) Applicant: Roadtec, Inc., Chattanooga, TN (US)

(72) Inventors: Todd Avans, Soddy Daisy, TN (US); James H. Bevill, Lookout Mountain, GA (US)

(73) Assignee: Roadtec, Inc., Chattanooga, TN (US)

( * ) Notice: Subject to any disclaimer, the term of this patent is extended or adjusted under 35 U.S.C. 154(b) by 0 days.

(21) Appl. No.: 16/038,871

(22) Filed: Jul. 18, 2018

(65) Prior Publication Data

US 2019/0024329 A1 Jan. 24, 2019

Related U.S. Application Data

(60) Provisional application No. 62/535,320, filed on Jul. 21, 2017.

(51) Int. Cl.
*E01C 23/088* (2006.01)
*E01C 23/12* (2006.01)
*B28D 1/18* (2006.01)

(52) U.S. Cl.
CPC .............. *E01C 23/088* (2013.01); *B28D 1/18* (2013.01); *E01C 23/127* (2013.01)

(58) Field of Classification Search
CPC ........ E01C 23/088; E01C 23/127; F16H 7/08; F16H 7/0827
See application file for complete search history.

(56) References Cited

U.S. PATENT DOCUMENTS

| 2,474,457 | A | * | 6/1949 | Barth | .................. | F16H 7/0827 |
| | | | | | | 474/119 |
| 4,036,070 | A | * | 7/1977 | Knight | .................. | F16H 7/0827 |
| | | | | | | 474/119 |
| 5,078,540 | A | | 1/1992 | Jakob et al. | | |
| 6,067,689 | A | | 5/2000 | Roney et al. | | |
| 6,733,086 | B1 | | 5/2004 | McSharry et al. | | |
| 7,644,994 | B2 | | 1/2010 | Busley et al. | | |
| 8,905,488 | B2 | | 12/2014 | Schafer et al. | | |
| 9,016,800 | B2 | | 4/2015 | Schafer et al. | | |
| 2011/0193397 | A1 | | 8/2011 | Menzenbach et al. | | |

(Continued)

OTHER PUBLICATIONS

International Search Report and Written Opinion of counterpart PCT Application No. PCT/US2018/42699 dated Sep. 26, 2018 (Year: 2018).*

*Primary Examiner* — David J Bagnell
*Assistant Examiner* — Michael A Goodwin
(74) *Attorney, Agent, or Firm* — Chambliss, Bahner & Stophel, P.C.

(57) ABSTRACT

A milling machine for milling a surface of a roadway includes a frame and a milling assembly having a cutter drum that is mounted for rotation with respect to the frame. The cutter drum has a drive shaft on which a sheave is mounted. A primary drum drive assembly is adapted to rotate the cutter drum with respect to the frame. The primary drum drive assembly includes a drive belt that cooperates with the sheave on the drive shaft for the cutter drum to rotate the cutter drum. A belt lift assembly may be operated to selectively disengage the drive belt from the sheave of the drive shaft for the cutter drum.

16 Claims, 8 Drawing Sheets

(56) References Cited

U.S. PATENT DOCUMENTS

| | | | |
|---|---|---|---|
| 2014/0333116 A1* | 11/2014 | Busley | E01C 23/088 299/10 |
| 2015/0035341 A1* | 2/2015 | Schafer | E01C 23/127 299/10 |
| 2015/0227120 A1 | 8/2015 | Laux et al. | |
| 2016/0231752 A1 | 8/2016 | Payne et al. | |
| 2017/0268636 A1* | 9/2017 | Musil | F16H 7/02 |
| 2017/0268637 A1* | 9/2017 | Musil | F16H 7/1281 |

* cited by examiner

DRIVE BELT DISENGAGEMENT FOR CUTTER DRUM OF MILLING MACHINE AND AUXILIARY DRUM DRIVE ASSEMBLY

CROSS-REFERENCE TO RELATED APPLICATION

This application claims the benefit of U.S. Provisional Patent Application No. 62/535,320 which was filed on Jul. 21, 2017.

FIELD OF THE INVENTION

This invention relates generally to an assembly for disengaging the drive belt of the primary drive assembly from the cutter drum of a milling machine in order to allow for safely moving the cutter drum through a small angle of rotation for the purposes of inspecting and repairing the cutter drum and replacing cutting teeth mounted thereon. A preferred embodiment of the invention also includes an auxiliary drive assembly for the cutter drum that is independent of the primary drum drive assembly and is adapted to move the cutter drum through a small angle of rotation at a low rotational speed.

BACKGROUND OF THE INVENTION

Roadway repair is often accomplished by overlaying the existing pavement (whether of concrete or asphalt composition) with a new layer (often called a leveling course) of concrete, asphalt or other surfacing materials. Without prior surface treatment, however, this method of repair generally results in the application of insufficient quantities of paving material in the rutted, potholed or otherwise damaged areas, because the overlay will be applied at the same rate per unit of roadway width in damaged areas (which have a greater depth across the width) as in the undamaged areas. The resulting reduced density in the overlay of the previously damaged areas will lead to renewed rutting or other wear damage in the new pavement in relatively short order. However, by milling the surface of the damaged pavement to an elevation below the level of damage, newly added pavement will have a uniform thickness across the entire width of the roadway. In addition, a repaving technique that includes milling a thickness of old pavement and replacing it with an equivalent thickness of new pavement will return the elevation of the roadway to its initial level, whereas the placement of a leveling course atop damaged pavement will tend to raise the surface of the roadway or some portion thereof above its original elevation. This can require the raising of road shoulders, guardrails and manhole covers and the adjustment of overpass clearances, all of which will be unnecessary if a proper milling technique is employed. A use of milling prior to repaving can also permit ready establishment of the proper road grade and slope, and thereby avoid drainage and safety problems. Furthermore, milling typically provides a rough surface that readily accepts and bonds with the new asphalt or other pavement overlay. Finally, milling can provide raw material that can be reclaimed for use in the production of new paving materials.

A milling machine typically comprises a wheeled or track-driven vehicle that includes a rotating cutter drum on which are mounted a plurality of cutting teeth. This cutter drum is mounted in a housing on the frame of the machine and is adapted to be lowered into contact with the road surface and rotated about a horizontal axis so as to cut into the surface to a desired depth as the machine is advanced along the roadway. The cutter drum is rotated by a primary drum drive assembly typically comprising a drive belt driven by a diesel engine, which drive belt engages a sheave on an input drive shaft for the cutter drum. A gear box is typically located between the sheave and the cutter drum and includes a gear train and an output drive shaft on which the cutter drum is rotated. The gear box thus allows for rotation of the output drive shaft for the cutter drum at a speed and torque that is different from that of the input drive shaft. Generally, the milling machine also includes a conveyor system that is designed to carry the milled material that has been cut from the roadway by the rotating cutter drum to a location in front of, to the rear of or beside the machine for deposit into a truck for removal from the milling site. Steerable track or wheel drive assemblies typically operated by hydraulic or electric motors are provided to drive the machine and to steer it along a desired milling path. Power for operation of the hydraulic motors that are typically employed to operate the conveyors and the drive assemblies is usually provided by the diesel engine.

A road stabilizer is similar to a milling machine in that it comprises a wheeled or track-driven vehicle that includes a rotating cutter drum on which are mounted a plurality of cutting teeth, which drum is rotated by a primary drum drive assembly typically comprising a belt drive that engages a sheave on an input drive shaft for the cutter drum. A gear box is typically located between the sheave and the cutter drum and includes a gear train and an output drive shaft on which the cutter drum is rotated. The gear box thus allows for rotation of the output drive shaft for the cutter drum at a speed and torque that is different from that of the input drive shaft. However, the cutter drum of a road stabilizer is generally employed to mill or pulverized an existing road bed or roadway to a greater depth than does a milling machine prior to repaving (usually called reclaiming) or prior to initial paving (usually called stabilizing), and it leaves the pulverized material in place. The pulverized material left behind is usually compacted and covered with one or more additional layers of crushed aggregate material before paving.

Cold in-place recycling ("CIR") machines can be used to repair damage to a roadway in a single pass, while reusing essentially all of the existing asphalt paving material. In the CIR process, damaged layers of asphalt pavement are removed. The removed material is processed and replaced on the roadway and then compacted. If a roadway has good structural strength, CIR can be an effective treatment for all types of cracking, ruts and holes in asphalt pavement. CIR can be used to repair asphalt roadways damaged by fatigue (alligator) cracking, bleeding (of excess asphalt cement), block cracking, corrugation and shoving, joint reflective cracking, longitudinal cracking, patching, polished aggregate, potholes, raveling, rutting, slippage cracking, stripping and transverse (thermal) cracking. CIR can almost always be used when there is no damage to the base of the roadway. Generally, CIR is only half as expensive as hot mix asphalt paving while providing approximately 80% of the strength of hot mix asphalt paving. CIR can be carried out with the aid of a milling machine or a road stabilizer/reclaimer machine that has been modified by mounting an additive spray bar in the cutter drum housing to inject an asphalt emulsion or foamed asphalt cement additive into the cutter drum housing. The asphalt emulsion or foamed asphalt cement additive is then thoroughly blended with the milled material by the cutter drum and can be left in a windrow or fed by the CIR machine's discharge conveyor directly into an asphalt paving machine. Generally, the additive material is supplied from a separate additive supply tank truck that is coupled to the modified milling machine or road stabilizer/reclaimer machine. The additive material is drawn directly from the tank on the additive supply truck and metered through an additive flow system that is mounted on the milling machine to the spray bar in the cutter drum housing.

Because the cutter drums of a conventional milling machine, a conventional road stabilizer and a milling machine or road stabilizer used in a CIR process operate in the same way for purposes of this invention, the term "milling machine" will be used hereinafter as a generic term that describes all three types of machines.

The cutting teeth on the cutter drum of a milling machine are subjected to significant wear forces as the milling, reclaiming, stabilizing or recycling process is carried out. These cutting teeth will break or become dull with use and must be periodically replaced. Consequently, it is necessary to inspect the cutter drum on a regular basis to determine if cutting teeth need to be replaced, to replace them, and to detect and repair any damage that has been incurred by the cutter drum. However, it is hazardous for maintenance personnel to get close enough to the cutter drum for inspection while the primary drum drive assembly for the milling machine is operating, or while the cutter drum is being rotated at any significant speed, because of the risk of injury due to proximity to the rotating drum. Furthermore, the cutter drum is generally rotated by the primary drum drive assembly at a speed that is too fast, even when the engine is throttled down, to allow any meaningful inspection of the cutter drum by maintenance personnel. Attempts to "bump" the rotation circuit of the primary drum drive assembly at engine idle speed in order to facilitate inspection may result in over-rotation that is not useful for inspection or uncontrolled rotation of the cutter drum that can ensnare the clothing of maintenance personnel on the cutting teeth within the drum housing.

Attempts have been made to rotate the cutter drum by hand with the power supply to the primary drive assembly of the cutter drum turned off, but the belt drive assembly, gearbox and other components of the typical primary drive assembly produce large frictional forces which must be overcome. Furthermore, the cutter drum of a milling machine is massive and heavy, and it requires considerable torque to move it.

Conventional systems are known for providing separate drive assemblies that operate on or through components of the primary drive assembly for the cutter drum. Thus, for example, U.S. Pat. Nos. 7,644,994, 8,167,378, 8,480,181, 8,807,662, 9,512,576 and 9,624,628 all describe auxiliary drive assemblies that operate by engaging one or more components of the primary drive assembly for the cutter drum. U.S. Pat. Nos. 8,905,488 and 9,016,800 describe an auxiliary drive assembly having a separate belt drive assembly that cooperates with components of the primary drum drive assembly to rotate the cutter drum.

All of these conventional systems operate with the primary drive assembly operatively attached to the cutter drum. Furthermore, all of these conventional auxiliary drive assemblies require cooperation with at least some of the components of the primary drive assembly. It would be desirable if a mechanism could be provided for disengaging the primary drive assembly from the cutter drum in order to prevent accidental or inadvertent rotation of the cutter drum by the primary drum drive assembly. It would also be desirable if a mechanism could be provided that would allow for rotation of the cutter drum through a small angle of rotation without having to overcome the large frictional forces inherent in the primary drive assembly. It would also be advantageous if an auxiliary drive assembly could be provided that is independent of the primary belt drive assembly.

ADVANTAGES OF PREFERRED EMBODIMENTS OF THE INVENTION

Among the advantages of the invention is that it provides an assembly for disengaging the primary drive assembly from the cutter drum in order to prevent accidental, inadvertent or uncontrolled rotation of the drum by the primary drum drive assembly and to allow for inspection and replacement of drum components with the primary drive assembly disengaged. Another advantage of a preferred embodiment of the invention is that it also allows for safe movement of the cutter drum by an auxiliary drum drive assembly that is independent of the primary drum drive assembly. Still another advantage of a preferred embodiment of the invention is that it allows for rotation of the cutter drum through a small angle of rotation without having to overcome the large frictional forces inherent in the primary drive assembly. Other advantages and features of this invention will become apparent from an examination of the drawings and the ensuing description.

NOTES ON CONSTRUCTION

The use of the terms "a", "an", "the" and similar terms in the context of describing the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

Terms concerning attachments, coupling and the like, such as "connected" and "interconnected", refer to a relationship wherein structures are secured or attached to one another either directly or indirectly through intervening structures, as well as both moveable and rigid attachments or relationships, unless specified herein or clearly indicated by context. The term "operatively connected" is such an attachment, coupling or connection that allows the pertinent structures to operate as intended by virtue of that relationship.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity.

Several terms are specifically defined herein. These terms are to be given their broadest reasonable construction consistent with such definitions, as follows:

The term "milling machine" refers to a vehicle having a cutter drum that is adapted to be rotated so as to cut into the surface on which the vehicle is operated, and includes machines typically called milling machines, cold planers, road stabilizers, road reclaimers and similar machines that are used in a cold in-place recycling process.

The term "linear actuator" refers to an electric, hydraulic, electro-hydraulic, pneumatic or mechanical device that generates force which is directed in a straight line. Common hydraulic and pneumatic "linear actuators" include a cylinder, a piston within the cylinder, and a rod attached to the piston. By increasing the pressure within the cylinder on one side of the piston (over that on the opposite side of the piston), the rod will extend from the cylinder or retract into the cylinder. A linear solenoid is a "linear actuator" that comprises an electrical coil wound around a cylindrical tube that contains a ferromagnetic actuator or plunger which is free to move axially along the tube. A return spring is generally provided at one end of the cylindrical tube or adjacent to a component that moves with the plunger. When an electrical current is passed through the coil, a magnetic field is established which attracts the plunger towards the center of the coil, causing it to move within the tube until it compresses the return spring. When the flow of electrical current stops, the return spring forces the plunger back out to its original rest position.

SUMMARY OF THE INVENTION

The invention relates to a milling machine that includes a milling assembly comprising a cutter drum that is mounted for rotation with respect to the frame of the milling machine. The milling assembly includes a primary drive assembly for the cutter drum having a drive shaft for the cutter drum on which a sheave is mounted. This primary drive assembly includes a drive belt that cooperates with the sheave on the drive shaft for the cutter drum to rotate the cutter drum with respect to the frame. The invention comprises an assembly for disengaging the primary drive assembly from the cutter drum of the milling machine. A belt lift assembly is provided which may be operated to selectively disengage the drive belt from the sheave of the drive shaft of the cutter drum. Preferably, the belt lift assembly includes a belt lifter that may be moved between a first position which allows the drive belt to engage with the sheave on the drive shaft for the cutter drum and a second position which disengages the drive belt from the sheave of the drive shaft for the cutter drum. A particularly preferred embodiment of the belt lift assembly comprises a driven gear that is mounted for rotation on the outside of the gear box of the primary drum drive assembly, a belt lifter that is fixed to the driven gear and an associated drive motor that is adapted to turn a shaft having a drive gear that mates with and rotates the driven gear. The preferred belt lift assembly is configured so that rotation of the drive gear by the drive motor causes the driven gear to move the belt lifter between a first position which is not in contact with the drive belt and a second position which lifts the drive belt out of contact with the sheave on the drive shaft for the cutter drum.

A preferred embodiment of the invention also includes an auxiliary drum drive assembly which is separate from the primary drive assembly for the cutter drum. This auxiliary drum drive assembly includes an auxiliary drive motor that is adapted to selectively engage an inner surface of the cutter drum. Preferably, the auxiliary drive motor comprises a drive wheel that is adapted to frictionally engage an inner surface of the cutter drum, and a linear actuator that is mounted between the auxiliary drive motor and a component of the cutter drum housing. This linear actuator is adapted to move the auxiliary drive motor between an engaged position in which the drive wheel engages an inner surface of the cutter drum and a disengaged position in which the drive wheel does not engage an inner surface of the cutter drum.

In order to facilitate an understanding of the invention, the preferred embodiments of the invention, as well as the best modes known by the inventors for carrying out the invention, are illustrated in the drawings, and a detailed description thereof follows. It is not intended, however, that the invention be limited to the particular embodiments described or to use in connection with the apparatus illustrated herein. Therefore, the scope of the invention contemplated by the inventors includes all equivalents of the subject matter described herein, as well as various modifications and alternative embodiments such as would ordinarily occur to one skilled in the art to which the invention relates. The inventors expect skilled artisans to employ such variations as seem to them appropriate, including the practice of the invention otherwise than as specifically described herein. In addition, any combination of the elements and components of the invention described herein in any possible variation is encompassed by the invention, unless otherwise indicated herein or clearly excluded by context.

BRIEF DESCRIPTION OF THE DRAWINGS

The presently preferred embodiment of the invention is illustrated in the accompanying drawings, in which like reference numerals represent like parts throughout, and wherein.

DESCRIPTION OF THE PREFERRED EMBODIMENTS OF THE INVENTION

Figure 1:
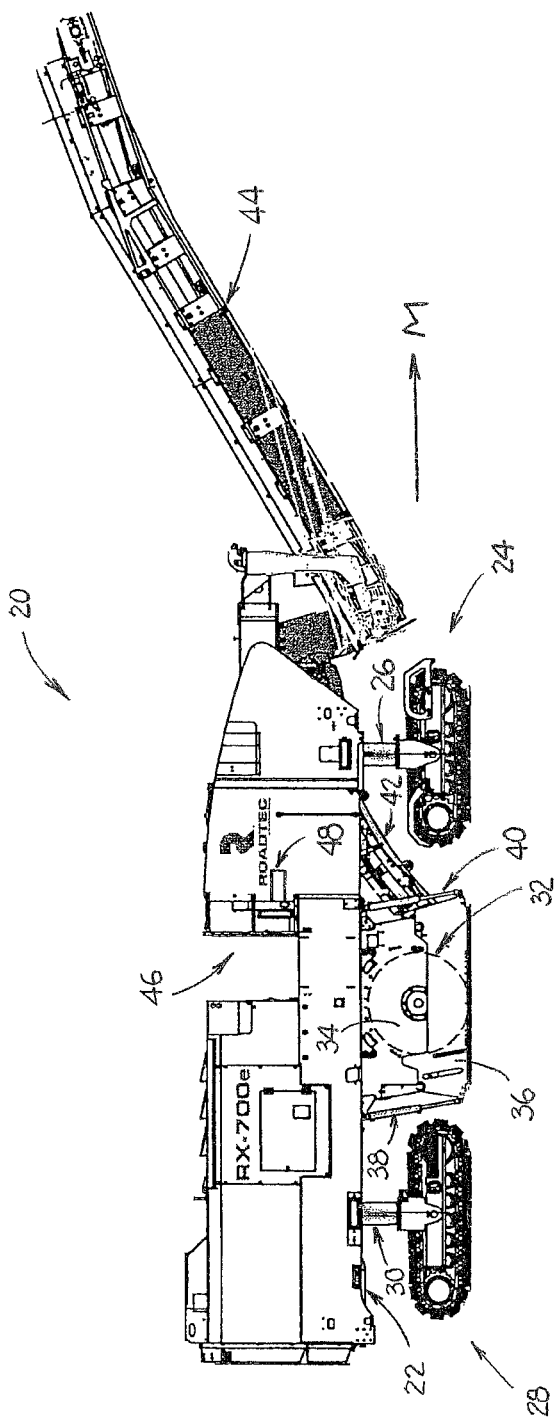
FIG. 1 is a side view of a milling machine to which the invention may be applied.

This description of preferred embodiments of the invention is intended to be read in connection with the accompanying drawings, which are to be considered part of the entire written description of this invention. The drawing figures are not necessarily to scale, and certain features of the invention may be shown exaggerated in scale or in somewhat schematic form in the interest of clarity and conciseness.

Figure 2:
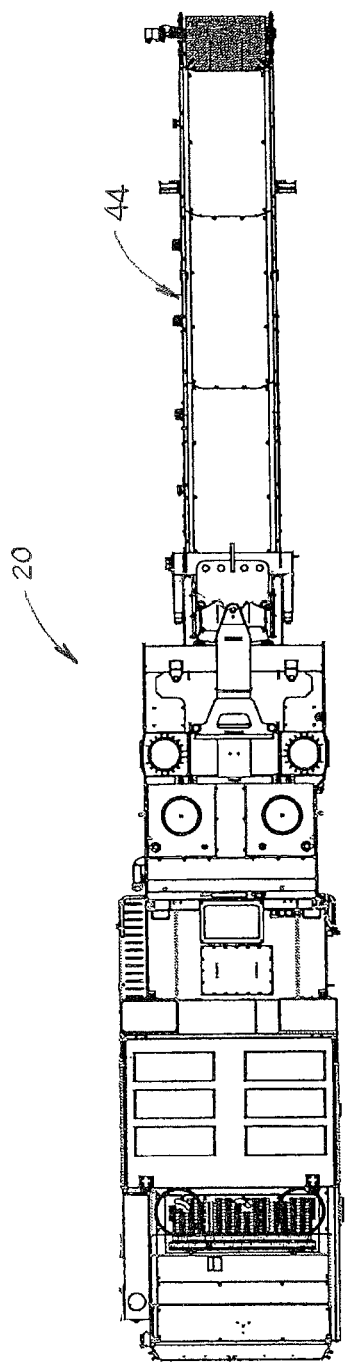
FIG. 2 is a top view of the milling machine shown in FIG. 1.

As shown in FIGS. 1 and 2, a milling machine that may be equipped with a preferred embodiment of the present invention is indicated generally at 20. This machine comprises a mobile vehicle having a frame 22 and a plurality of ground-engaging drive assemblies, including right front track drive assembly 24, which includes lifting column 26, a left front track drive assembly (not shown but substantially similar to right front track drive assembly 24), right rear track drive assembly 28, which includes lifting column 30, and a left rear track drive assembly (not shown but substantially similar to right rear drive track assembly 28). As is known to those having ordinary skill in the art, the milling machine may include as few as three ground-engaging drive assemblies, and the ground-engaging drive assemblies may be wheel-driven instead of track-driven.

As is conventional, linear actuators (not shown) within the lifting columns of the ground-engaging drive assemblies are adapted to raise and lower the frame of the milling machine with respect to the surface being milled. Preferably, the front drive assemblies are steerable to provide precise directional control. The drive assemblies of machine 20 are driven by a machine drive system including conventional hydraulic motors (not shown) and an engine (also not shown) to advance the machine across the surface of a roadway, parking lot or other surface to be milled in the working direction (or milling direction) indicated by arrow M.

Milling machine 20 also includes a milling assembly comprising a generally cylindrical cutter drum 32 having a plurality of cutting teeth (not shown) mounted thereon. The cutter drum is mounted for rotation on the frame of milling machine 20 by action of a conventional primary drum drive assembly (not shown) that operates to rotate the cutter drum within a drum housing including upper right side plate 34 and lower right side plate 36. Upper right side plate 34 is fixed to frame 22, and lower right side plate 36 is adapted to move upwardly and downwardly with respect to the upper right side plate by the action of linear actuators 38 and 40. The drum housing includes side plates (not shown) that are substantially similar to upper right side plate 34 and lower right side plate 36 on the left side of the machine, as well as linear actuators (not shown) that are substantially similar to linear actuators 38 and 40. Cutter drum 32 is adapted for cutting a width of material from the surface in the path of the machine, and depositing the milled material on first conveyor 42, which carries it to second conveyor 44 for discharge into a truck.

Milling machine 20 is operated by an operator in operator's station 46 which includes controller 48. Controller 48 may embody a single microprocessor or multiple microprocessors that include components for controlling the invention and other operations of milling machine 20 based on input from an operator of the milling machine and on sensed, measured or other known operational parameters. Controller 48 may include or be associated with a memory component, a data input component such as a joystick, a touch screen, a keyboard and/or a plurality of actuating buttons, a secondary storage device, a processor and other components for running an application. Various circuits may be associated with and operatively connected to controller 48, such as power supply circuitry and hydraulic circuitry. Numerous commercially available microprocessors can be configured to perform the functions of controller 48. It should be appreciated that controller 48 could readily be embodied in a general purpose computer or machine microprocessor capable of controlling numerous milling machine functions.

FIGS. 3-8 illustrate a preferred embodiment of an assembly for disengaging the primary drive assembly from the cutter drum of a milling machine such as milling machine 20. As shown therein, belt lift assembly 50 is adapted to disengage drive belt 52 of the primary drive assembly from sheave 54 that is mounted on the input drive shaft for the cutter drum. Belt lift assembly 50 includes driven gear 56 that is rotationally mounted with respect to gear saddle 58 (shown in FIG. 5), which is fixed to the outside of gear box 59 (shown in FIG. 3) of the primary drum drive assembly. Thus, driven gear 56 is adapted to rotate about axis of rotation AR (that is coincident with the axis of rotation of sheave 54) with respect to gear saddle 58 and gear box 59. Preferred belt lifter 64 is fixed to driven gear 56 and is supported by capture plate 60 (shown in FIGS. 3 and 4), which is also fixed to the driven gear. Preferred belt lifter 64 is curved in an arc having a radius that is slightly larger than that of sheave 54. Drive motor 66 is adapted to turn shaft 68 on which drive gear 70 is mounted, which drive gear is mated with driven gear 56 to rotate the driven gear about axis of rotation AR. Drive motor 66 and driven gear 56 are configured so that rotation of the drive gear 70 by drive motor 66 causes the driven gear to move the belt lifter between a first position which is not in contact with drive belt 52 (shown in FIG. 3) and a second position (not shown) which interposes belt lifter 64 between sheave 54 and drive belt 52 and lifts the drive belt out of contact with the sheave. Directional arrows "D" in FIGS. 4 and 5 indicate the movement of driven gear 56 back and forth between the first and second positions.

Figure 7:
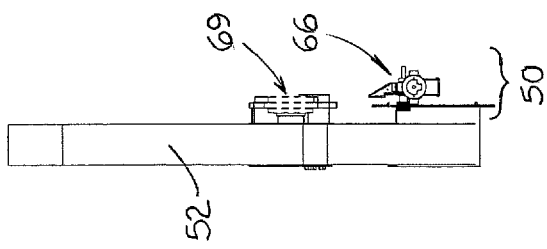
FIG. 7 is a side view of the belt lift assembly and drive belt shown in FIG. 6.
Figure 6:
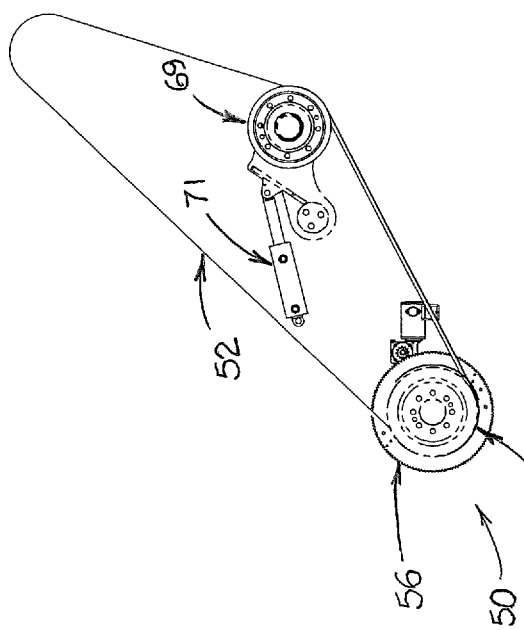
FIG. 6 is a front view of the belt lift assembly shown in FIGS. 3-5, as well as the drive belt of the primary drive assembly for the cutter drum.
Figure 8:
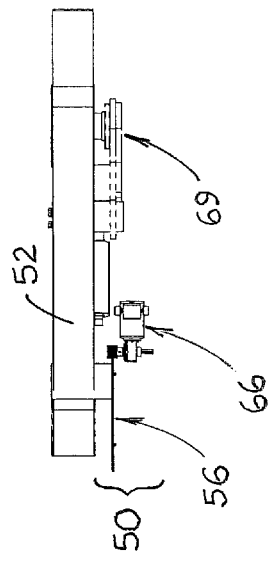
FIG. 8 is a top view of the belt lift assembly and drive belt shown in FIGS. 6 and 7.
Figure 9:
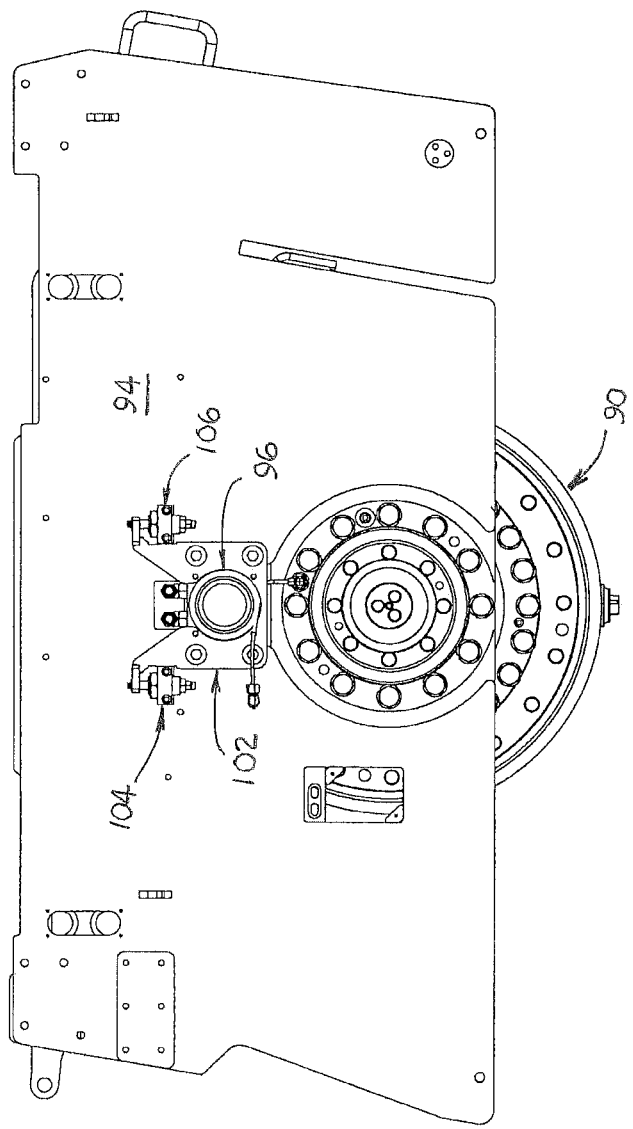
FIG. 9 is a side view of a portion of the drum housing and milling drum of a milling machine, showing a preferred embodiment of the auxiliary drum drive assembly.
Figure 10:
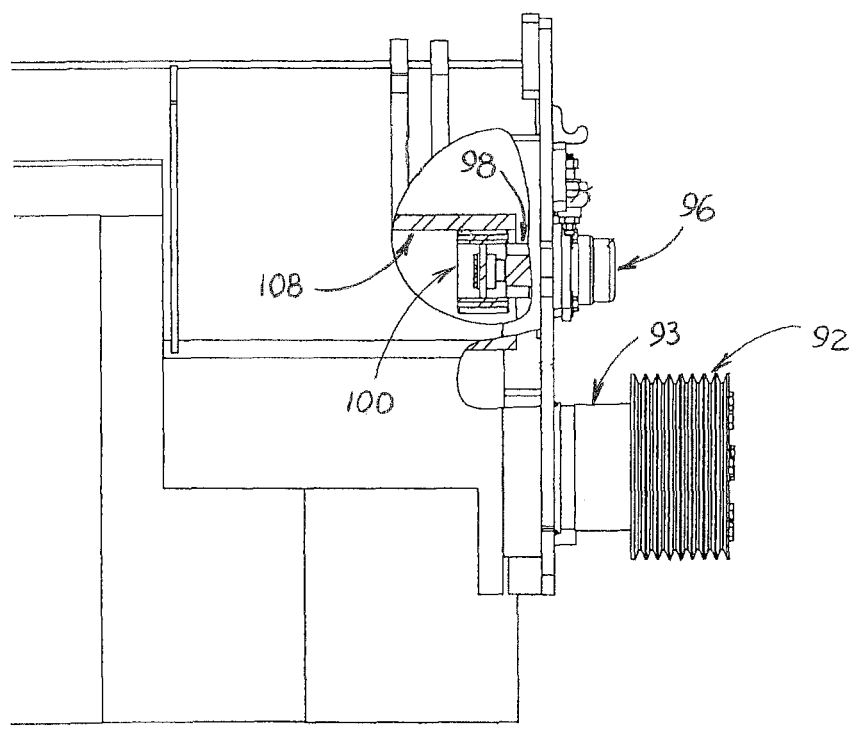
FIG. 10 is a partially sectional end view of a portion of the drum housing, milling drum and auxiliary drum drive assembly shown in FIG. 9.

As shown in FIGS. 6-8, the primary drive assembly includes a belt tensioning assembly including tensioning sheave 69 and tensioning actuator 71 that is operatively attached to the tensioning sheave. As is known to those having ordinary skill in the art to which the invention relates, a tensioning sheave such as tensioning sheave 69 is pivotally mounted within the primary drive assembly so that a linear actuator such as tensioning actuator 71 may be employed to move the tensioning sheave in order to adjust the tension of a drive belt such as drive belt 52. In a preferred embodiment of the invention, it may be necessary to reduce the tension on drive belt 52 prior to moving belt lifter 64 to the second position. In this embodiment of the invention, tensioning actuator 71 is operatively connected to controller 48 in such a manner that controller 48 may extend or retract the rod of tensioning actuator 71 to increase or decrease the tension in drive belt 52.

Figure 3:
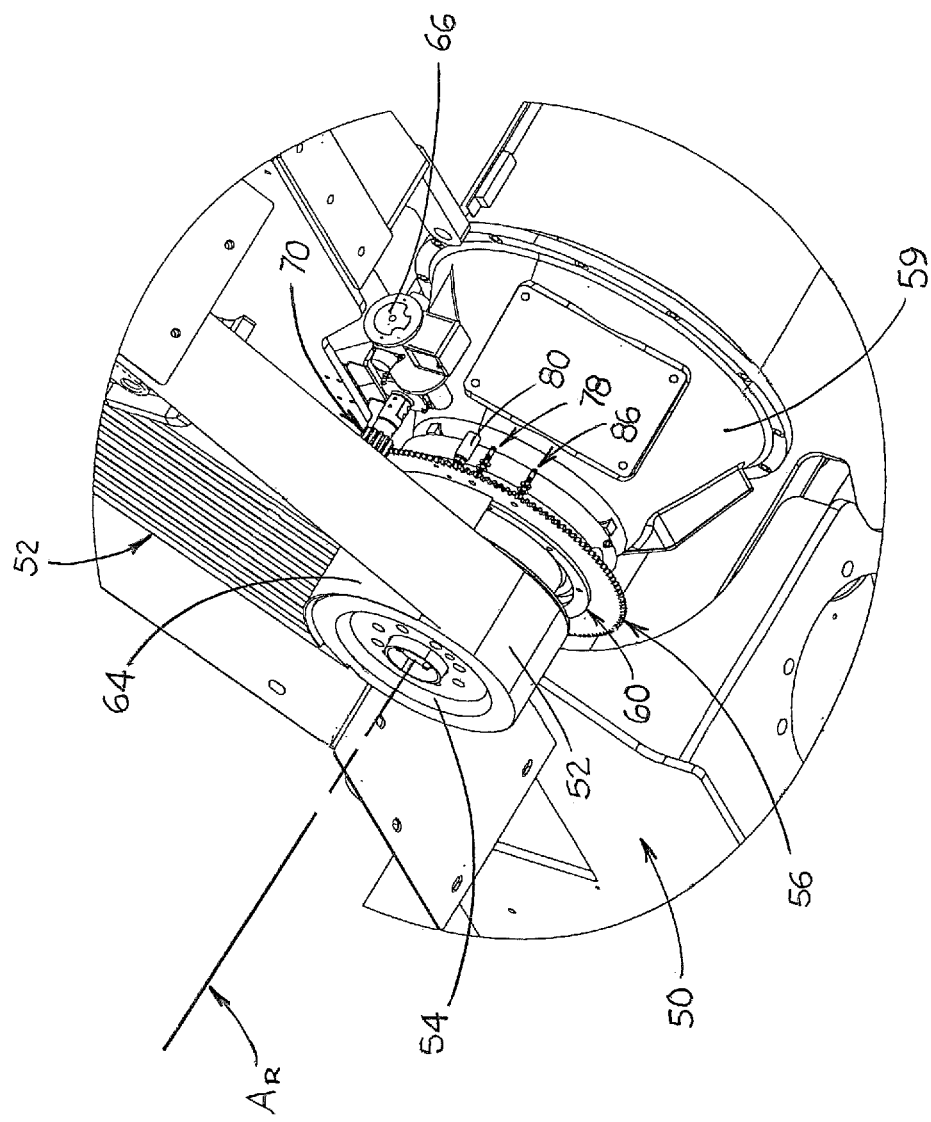
FIG. 3 is a perspective view of a preferred belt lift assembly that is adapted to disengage the drive belt of the primary drum drive assembly from the sheave on the input drive shaft for the cutter drum.

The length of belt lifter 64 along its arc is selected so that it will not contact any part of belt 52 when in the first position shown in FIG. 3, but is sufficient to interrupt the drive engagement of drive belt 52 and sheave 54 when in the second position. The required length of belt lifter 64 along its arc will depend on the configuration of the drive assembly for rotating the cutter drum. More particularly, the required length of belt lifter 64 along its arc will depend, at least in part, on the diameter of sheave 54 and on the diameter, location and spacing of the output drive sheave (not shown) of the primary drum drive and any tensioning sheaves to which drive belt 52 may be attached.

Figure 4:
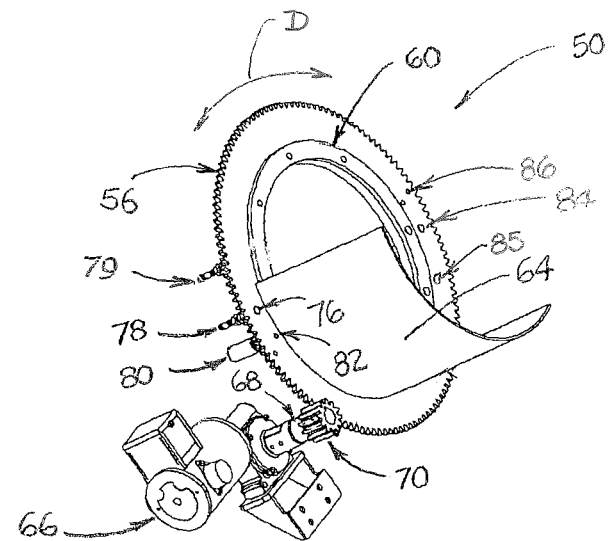
FIG. 4 is a front perspective view of the belt lift assembly shown in FIG. 3.
Figure 5:
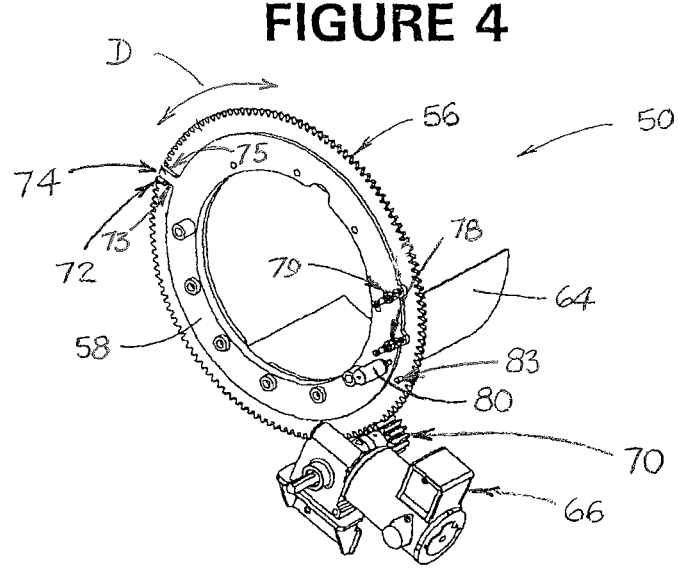
FIG. 5 is a rear perspective view of the belt lift assembly shown in FIGS. 3 and 4.

When belt lifter 64 is in the first position which is not in contact with drive belt 52 (as shown in FIGS. 3-5), first rotation stop 72 on the driven gear is in contact with first side 73 of radially extending drive stop peg 74 (shown in FIG. 5)

on gear saddle 58. When the driven gear is in this position, first position sensor hole 76 in driven gear 56 is aligned with first position sensor 78, and a locking mechanism preferably comprising linear solenoid 80 is aligned with first receiver hole 82 in driven gear 56. When controller 48 perceives that first position sensor 78 is aligned with first position sensor hole 76, the controller will actuate linear solenoid 80 to engage first receiver hole 82 in driven gear 56 to lock the driven gear in the first position against further rotation.

When it is desired to move belt lifter 64 from the first position shown in FIGS. 3-5 to the second position which lifts drive belt 52 out of contact with sheave 54 and disengages the cutter drum from the primary drum drive assembly, it may be necessary, as described above, to reduce the tension on drive belt 52 in order to be able to interpose belt lifter 64 between sheave 54 and drive belt 52. Consequently, in a preferred embodiment of the invention, controller 48 will cause tensioning actuator 71 to reduce the tension on drive belt 52. Thereafter, controller 48 will unlock the driven gear against rotation by actuating linear solenoid 80 to disengage from first receiver hole 82 in driven gear 56. Then the controller will cause motor 66 to rotate shaft 68 to cause drive gear 70 to rotate driven gear 56 until second rotation stop 83 on the driven gear makes contact with second side 75 of radially extending drive stop peg 74 on gear saddle 58. When the driven gear is in this position, belt lifter 64 is in the second position which lifts belt 52 out of contact with sheave 54, second position first sensor hole 84 in driven gear 56 is aligned with first position sensor 78, second position second sensor hole 85 is aligned with second position sensor 79, and linear solenoid 80 is aligned with second receiver hole 86. When controller 48 perceives that first position sensor 78 is aligned with second position first sensor hole 84 and second position sensor 79 is aligned with second position second sensor hole 85, it will actuate linear solenoid 80 to engage second receiver hole 86 in driven gear 56 to lock the driven gear in the second position against further rotation.

When the belt lifter is in the second position so that the cutter drum is no longer engaged with the primary drum drive assembly, the cutter drum may be moved by hand to facilitate inspection of the cutter drum, or an auxiliary drum drive assembly may be provided which is separate from the primary drive assembly for the cutter drum. This auxiliary drum drive assembly includes an auxiliary drive motor that is adapted to selectively engage an inner surface of the cutter drum, as described hereinafter in more detail.

When the inspection and any maintenance or repairs have been completed, belt lifter 64 is moved from the second position which lifts drive belt 52 out of contact with sheave 54 and disengages the cutter drum from the primary drum drive assembly to the first position in which belt lifter 64 is not in contact with belt 52. This is accomplished by causing the controller to unlock the driven gear against rotation by actuating linear solenoid 80 to disengage from second receiver hole 86 in driven gear 56. Then the controller causes motor 66 to rotate shaft 68 to cause drive gear 70 to rotate driven gear 56 until first rotation stop 72 on the driven gear makes contact with first side 73 of radially extending drive stop peg 74 on gear saddle 58. When the driven gear is in this position, belt lifter 64 is in the first position out of contact with drive belt 52, first position sensor hole 76 in driven gear 56 is aligned with first position sensor 78, and linear solenoid 80 is aligned with first receiver hole 82 in driven gear 56. When controller 48 perceives that first position sensor 78 is aligned with first position sensor hole 76, it will actuate linear solenoid 80 to engage first receiver hole 82 in driven gear 56 to lock the driven gear in the first position against further rotation. Thereafter, the controller may be employed to cause tensioning actuator 71 to increase the tension on drive belt 52 in order that the drive belt will fully engage sheave 54.

FIGS. 9-12 illustrate components of a milling machine that is substantially similar to machine 20 and includes the preferred auxiliary drive assembly. As shown therein, cutter drum 90 is mounted for rotation on the frame of the milling machine by action of a conventional primary drum drive assembly (not shown) that includes sheave 92 which is mounted on input drive shaft 93 for cutter drum 90. The cutter drum is mounted so as to rotate within a drum housing including upper right side plate 94 and a lower right side plate (not shown but substantially similar to lower right side plate 36 of milling machine 20). The upper right side plate 94 is fixed to the frame (not shown), and the lower right side plate is adapted to move upwardly and downwardly with respect to the upper right side plate by the action of a pair of linear actuators (not shown but substantially similar to linear actuators 38 and 40 of milling machine 20). The preferred embodiment of the invention comprises an auxiliary drum drive assembly including auxiliary drive motor 96 which includes shaft 98 on which is mounted drive wheel 100. Auxiliary drive motor 96 is mounted on drive frame 102 in such a manner that shaft 98 extends through a hole in upper right side plate 94. A pair of linear actuators 104 and 106 are mounted between upper right side plate 94 and drive frame 102 and are adapted to move drive wheel 100 between an engaged position (illustrated in FIGS. 9 and 10) in which drive wheel 100 frictionally engages inner surface 108 of cutter drum 90 and a disengaged position in which the drive wheel does not engage an inner surface of the cutter drum. In other embodiments of the invention (not shown), the drive wheel may be fitted with a gear that engages a mating gear within the cutter drum.

Figure 11:
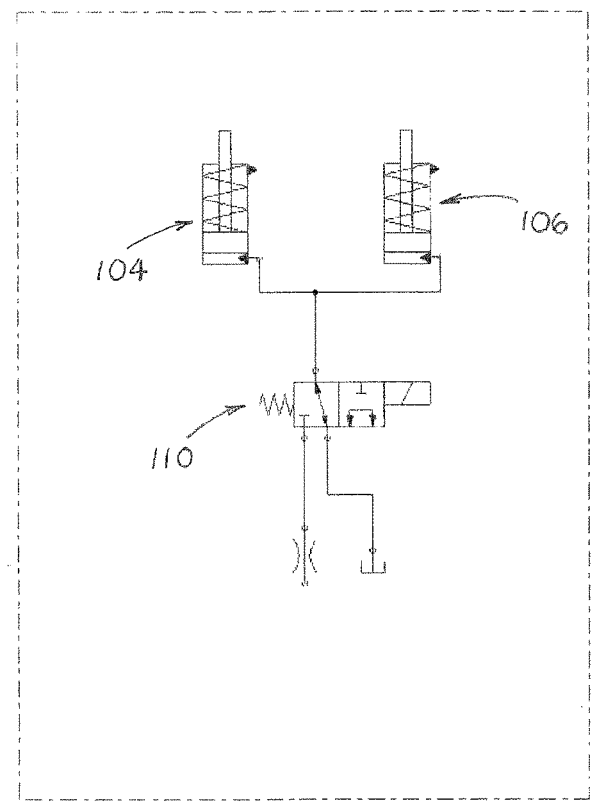
FIG. 11 is a schematic view of a first portion of the hydraulic circuit for the auxiliary drum drive assembly according to a preferred embodiment of the invention.
Figure 12:
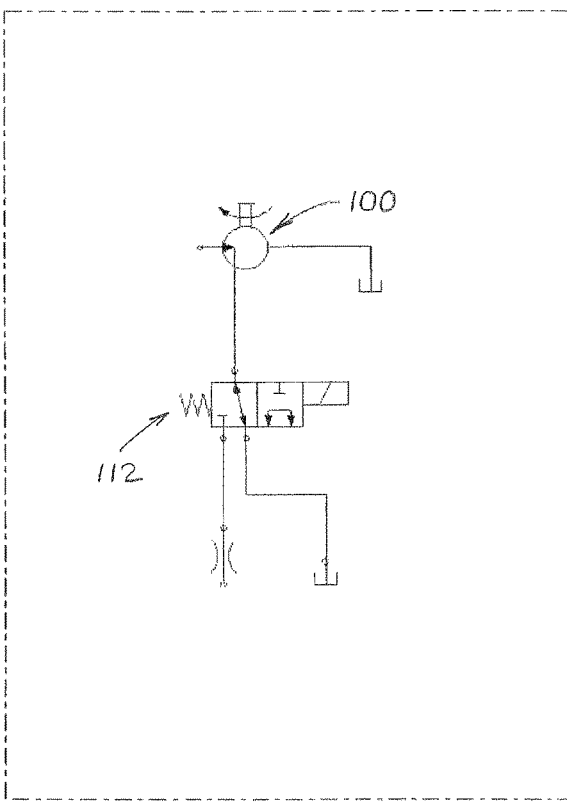
FIG. 12 is a schematic view of a portion of the auxiliary drum drive assembly and a second portion of the hydraulic circuit for the auxiliary drum drive assembly according to a preferred embodiment of the invention.

Referring now to FIGS. 11 and 12, when a controller such as controller 48 is operated to disengage the primary drum drive assembly and to engage the auxiliary drum drive assembly, hydraulic spool valve 110 will change state and stoke linear actuators 104 and 106. This will enable a momentary control button (not shown) that is operatively connected to the controller to cause linear actuators 104 and 106 to move auxiliary drive motor 96 to place drive wheel 100 into frictional engagement with inner surface 108 of cutter drum 90. The momentary control button may then be depressed by the operator to control hydraulic spool valve 112 and to cause auxiliary drive motor 96 to move at a predetermined rate of rotation through an angle of rotation selected by the operator (and determined by engagement of the momentary control button) in order to permit the safe inspection of the outer surface of the cutter drum and to enable drum maintenance and any necessary replacement of cutting teeth on the cutter drum.

It is likely, especially in the embodiments of the invention in which controller 48 is operated to reduce the tension on drive belt 52, that drive belt 52 will slide on the surface of belt lifter 64 as drive wheel 100 is operated to move cutter drum 90.

The auxiliary drum drive assembly of a preferred embodiment of the invention is thus separate from the primary drive assembly for the cutter drum. In this embodiment of the invention, the controller permits operation of the auxiliary drive assembly only when the belt lift assembly has disengaged the drive belt from the sheave of the drive shaft for the cutter drum. When the primary drum drive assembly is disengaged and the auxiliary drum drive assembly placed into operational status, the auxiliary drum drive assembly can be employed to move the cutter drum through a small angle of rotation at a low rotational speed in order to facilitate inspection of the cutter drum and the making of any necessary repairs.

Although this description contains many specifics, these should not be construed as limiting the scope of the invention but as merely providing illustrations of the presently preferred embodiments thereof, as well as the best modes contemplated by the inventors of carrying out the invention. The invention, as described and claimed herein, is susceptible to various modifications and adaptations, as would be understood by those having ordinary skill in the art to which the invention relates.

What is claimed is:

1. A milling machine for milling a surface of a roadway, said milling machine comprising:
   (a) a frame;
   (b) a milling assembly comprising a cutter drum that is mounted for rotation with respect to the frame, said cutter drum having a drive shaft on which a sheave is mounted;
   (c) a primary drum drive assembly that is adapted to rotate the cutter drum with respect to the frame, said primary drum drive assembly including a drive belt that cooperates with the sheave on the drive shaft for the cutter drum to rotate the cutter drum;
   (d) a belt lift assembly that may be operated to selectively disengage the drive belt from the sheave of the drive shaft for the cutter drum by interposing a belt lifter between the sheave of the drive shaft for the cutter drum and the drive belt.

2. The milling machine of claim 1 wherein the belt lift assembly comprises
   means for moving the belt lifter between a first position which allows the drive belt to engage with the sheave on the drive shaft for the cutter drum and a second position which disengages the drive belt from the sheave of the drive shaft for the cutter drum.

3. The milling machine of claim 2 wherein movement of the belt lifter from the first position to the second position interposes the belt lifter between the sheave on the drive shaft for the cutter drum and the drive belt.

4. The milling machine of claim 1 wherein:
   (a) the primary drum drive assembly includes a gear box;
   (b) the belt lifter of the belt lift assembly
       is fixed to a driven gear that is mounted for rotation on the gear box of the primary drum drive assembly;
   (c) the belt lift assembly further comprises a drive motor comprising a shaft having a drive gear mounted thereon, which drive gear is mated to the driven gear so that rotation of the drive gear by the drive motor causes the driven gear to move the belt lifter between a first position which is not in contact with the drive belt and a second position which lifts the drive belt out of contact with the sheave on the drive shaft of the cutter drum.

5. The milling machine of claim 4 wherein the belt lifter is curved in an arc and has a length along its arc that is selected so that the belt lifter will not contact any part of the drive belt when the belt lifter is in the first position.

6. The milling machine of claim 4 wherein:
   (a) the belt lift assembly includes a gear saddle that is fixed to onto the gear box;
   (b) the driven gear is rotationally mounted with respect to the gear saddle;
   (c) the belt lifter is fixed to the driven gear;
   (d) the sheave of the drive shaft for the cutter drum has a radius;
   (e) the belt lifter is curved in an arc having a radius that is larger than the radius of the sheave of the drive shaft for the cutter drum.

7. The milling machine of claim 6 which includes a capture plate that is attached to the driven gear and is adapted to support the belt lifter on the driven gear.

8. The milling machine of claim 6 further comprising:
   (a) a controller;
   (b) a position sensor on the gear saddle, which position sensor is operatively attached to the controller;
   (c) a first sensor hole on the driven gear that is positioned so as to align with the position sensor when the belt lifter is in the first position;
   (d) a second sensor hole on the driven gear that is positioned so as to align with the position sensor when the belt lifter is in the second position.

9. The milling machine of claim 6 further comprising:
   (a) a controller;
   (b) a locking mechanism on the gear saddle, said locking mechanism being operatively attached to the controller;
   (c) a first receiver hole in the driven gear that is located so as to be aligned with the locking mechanism when the belt lifter is in the first position so that the controller may operate the locking mechanism to lock the driven gear in the first position;
   (d) a second receiver hole in the driven gear that is located so as to be aligned with the locking mechanism when the belt lifter is in the second position so that the controller may operate the locking mechanism to lock the driven gear in the second position.

10. The milling machine of claim 9 further comprising:
    (a) a position sensor on the gear saddle, said position sensor being operatively attached to the controller;
    (b) a first position sensor hole in the driven gear that is located so as to be aligned with the position sensor when the belt lifter is in the first position so that the controller may operate the locking mechanism to lock the driven gear in the first position;
    (c) a second position sensor hole in the driven gear that is located so as to be aligned with the position sensor when the belt lifter is in the second position so that the controller may operate the locking mechanism to lock the driven gear in the second position.

11. The milling machine of claim 6 further comprising:
    (a) a drive stop peg on the gear saddle;
    (b) a first rotation stop on the driven gear that is positioned so as to make contact with the drive stop peg when the belt lifter is in the first position;
    (c) a second rotation stop on the driven gear that is positioned so as to make contact with the drive stop peg when the belt lifter is in the second position.

12. The milling machine of claim 11 wherein:
    (a) the drive stop peg has a first side and a second side;
    (b) the first rotation stop will make contact with the first side of the drive stop peg when the belt lifter is in the first position;
    (c) the second rotation stop will make contact with the second side of the drive stop peg when the belt lifter is in the second position.

13. The milling machine of claim 1:
    (a) which includes a tensioning assembly comprising:
        (i) a tensioning sheave that engages the drive belt of the primary drum drive assembly;

(ii) a tensioning actuator that is operatively attached to the tensioning sheave and adapted to move the tensioning sheave in order to adjust the tension of the drive belt;
(b) which includes a controller that is operatively connected to the tensioning actuator and is adapted to cause the tensioning actuator to increase or decrease the tension of the drive belt.

14. The milling machine of claim 1:
(a) which includes an auxiliary drum drive assembly;
(b) which includes a controller:
   (i) that is operatively connected to the primary drum drive assembly and to the auxiliary drum drive assembly;
   (ii) that permits operation of the auxiliary drum drive assembly only when the belt lift assembly has disengaged the drive belt from the sheave of the drive shaft for the cutter drum.

15. A milling machine for milling a surface of a roadway, said milling machine comprising:
(a) a frame;
(b), a milling assembly comprising a cutter drum that is mounted for rotation with respect to the frame, said cutter drum having a drive shaft on which a sheave is mounted;
(c) a primary drum drive assembly that is adapted to rotate the cutter drum with respect to the frame, said primary drum drive assembly including a drive belt that cooperates with the sheave on the drive shaft for the cutter drum to rotate the cutter drum;
(d) a belt lift assembly that may be operated to selectively disengage the drive belt from the sheave of the drive shaft for the cutter drum;
(e) wherein the cutter drum:
   (i) has an inner surface;
   (ii) is mounted for rotation with respect to the frame in a housing;
(f) which includes an auxiliary drum drive assembly that comprises:
   (i) an auxiliary drive motor comprising a drive wheel that is adapted to frictionally engage the inner surface of the cutter drum;
   (ii) a linear actuator that is mounted between the auxiliary drive motor and the housing, said linear actuator being adapted to move the auxiliary drive motor between an engaged position in which the drive wheel engages the inner surface of the cutter drum and a disengaged position in which the drive wheel does not engage the inner surface of the cutter drum;
(g) which includes a controller:
   (i) that is operatively connected to the primary drum drive assembly and to the auxiliary drum drive assembly;
   (ii) that permits operation of the auxiliary drum drive assembly only when the belt lift assembly has disengaged the drive belt from the sheave of the drive shaft for the cutter drum.

16. The milling machine of claim 15 comprising a control button that may be selectively operated to cause the auxiliary drive motor to move at a predetermined rate of rotation through an angle of rotation that is determined by engagement of the control button.

* * * * *